United States Patent
Kuchi et al.

(10) Patent No.: US 12,323,278 B2
(45) Date of Patent: *Jun. 3, 2025

(54) SYSTEMS AND METHODS FOR TRANSMITTING CONTROL DATA IN A COMMUNICATION NETWORK

(71) Applicant: WISIG NETWORKS PRIVATE LIMITED, Hyderabad (IN)

(72) Inventors: Kiran Kumar Kuchi, Hyderabad (IN); Sibgath Ali Khan Makandar, Hyderabad (IN)

(73) Assignee: WISIG NETWORKS PRIVATE LIMITED (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,098

(22) Filed: Jan. 2, 2024

(65) Prior Publication Data

US 2024/0291697 A1    Aug. 29, 2024

Related U.S. Application Data

(63) Continuation of application No. 17/522,509, filed on Nov. 9, 2021, now Pat. No. 11,894,955, which is a
(Continued)

(30) Foreign Application Priority Data

| Jul. 14, 2017 | (IN) | ............................. 201741024935 |
| Aug. 4, 2017 | (IN) | ............................. 201741027870 |
| Aug. 11, 2017 | (IN) | ............................. 201741028728 |

(51) Int. Cl.
*H04L 25/03* (2006.01)
*H04L 5/00* (2006.01)
(Continued)

(52) U.S. Cl.
CPC ...... *H04L 25/03343* (2013.01); *H04L 5/0007* (2013.01); *H04L 5/0055* (2013.01); *H04L 27/2607* (2013.01); *H04L 27/3411* (2013.01)

(58) Field of Classification Search
None
See application file for complete search history.

(56) References Cited

U.S. PATENT DOCUMENTS

| 11,206,166 B2 * | 12/2021 | Kuchi | ................... H04L 5/0007 |
| 2009/0046645 A1 | 2/2009 | Bertrand et al. | |

(Continued)

FOREIGN PATENT DOCUMENTS

WO    2016117973 A1    7/2016

OTHER PUBLICATIONS

Int'l Search Report and Written Opinion Appln No. PCT/IN2018/050459 mailed Oct. 16, 2018.
(Continued)

*Primary Examiner* — Diane L Lo
(74) *Attorney, Agent, or Firm* — McAndrews, Held & Malloy, Ltd.

(57) ABSTRACT

Embodiments of the present disclosure relate to a method and system for transmitting a sequence with low peak-to-average-power-ratio (PAPR). A communication system receives control data. A transmitter of the communication system comprises a plurality of sequences which are associated with the control data in the transmitter. The transmitter selects a sequence from the plurality of sequence. The selected sequence is rotated, pre-coded for generating pre-coded sequence. DFT is applied on the pre-coded sequence for generating frequency domain signals. The frequency domain signals are processed and corresponding waveform is transmitted to a receiver of the communication system. The receiver receives the waveform and is processed to
(Continued)

extract the sequence from the waveform. The receiver correlates the extracted sequence with plurality of sequences stored in receiver memory to detect the control data. The generated waveform has low PAPR.

49 Claims, 5 Drawing Sheets

Related U.S. Application Data continuation of application No. 16/630,674, filed as application No. PCT/IN2018/050459 on Jul. 14, 2018, now Pat. No. 11,206,166.

(51) Int. Cl.
*H04L 27/26* (2006.01)
*H04L 27/34* (2006.01)

(56) References Cited

U.S. PATENT DOCUMENTS

| | | | |
|---|---|---|---|
| 2011/0134747 A1 | 6/2011 | Kwon et al. | |
| 2018/0241603 A1* | 8/2018 | Jia | H04L 27/2614 |
| 2019/0036746 A1* | 1/2019 | Hwang | H04L 27/2613 |
| 2020/0045691 A1* | 2/2020 | Park | H04L 5/0053 |
| 2021/0144699 A1* | 5/2021 | Matsumura | H04L 1/1812 |

OTHER PUBLICATIONS

T. Jiang and Y. Wu, "An Overview: Peak-to-Average Power Ratio Reduction Techniques for OFDM Signals," in IEEE Transactions on Broadcasting, vol. 54, No. 2, pp. 257-268, Jun. 2008, doi: 10.1109/TBC.2008.915770.

Roque et al., "Weighted cyclic prefix OFDM: PAPR analysis and performance comparison with DFT-precoding", Signals, Systems and Computers (ASILOMAR), Conference Record of the Forty Sixth Asilomar Conference on. IEEE, 2012, PP.

K. Kuchi, "Partial Response DFT-precoded-OFDM Modulation," IEEE Trans. on Emerging Tele. Tech., May 2012.

F. Khan, "LTE for 4G Mobile Broadband Air Interface Technologies and Performance." New York, NY: Cambridge University Press, 2009.

Iith et al., "Comparison of pi/2 BPSK with and without frequency domain pulse shaping: Results with PA model," 3GPP TSG-RAN WG1 Ad-Hoc NR Meeting, R1-1701180, Spokane, WA, USA, Jan. 16-20, 2017.

* cited by examiner

SYSTEMS AND METHODS FOR TRANSMITTING CONTROL DATA IN A COMMUNICATION NETWORK

This application is a continuation of U.S. patent application Ser. No. 18/402,098 filed Jan. 2, 2024, which is a continuation of U.S. patent application Ser. No. 16/630,674 filed Jan. 13, 2020, which claims the benefit of Indian provisional application number 201741024935, filed on Jul. 14, 2017; Indian provisional application number 201741027870 filed on Aug. 4, 2017 and Indian provisional application number 201741028728 filed on Aug. 11, 2017; which hereby incorporated by reference.

TECHNICAL FIELD

Embodiments of the present disclosure are related, in general to communication, but specifically but not exclusively relate to method and system for transmitting control data having low peak-to-average power ratio (PAPR).

BACKGROUND

Presently, 5G new radio (NR) supports enhanced mobile broadband (eMBB), ultra-reliable-low-latency-communication (URLLC) and massive-machine-type-communication (mMTC) for frequency bands below 6 GHz, as well as above 6 GHz, including millimeter wave bands i.e. 20-40 GHz and 60-80 GHz.

Also, ultra-low latency requires uplink control information such as hybrid automatic repeat request (ARQ) acknowledge/no-acknowledge (ACK/NACK), for the of successful decoding of block through 1-bit ACK/NACK commands, and uplink sounding reference signal (SRS) to be sent to the base station with very low delay. Other control information comprises channel quality indicator (CQI), multiple input multiple output (MIMO) rank and other information.

As per the standard specifications, 5G requires a method of multiplexing control, data, and SRS signals using certain waveform. The 5G NR supports both Discrete Fourier Transform-spread-Orthogonal frequency-division multiplexing (DFT-s-OFDM) based waveform and Orthogonal frequency-division multiplexing (OFDM) waveform for uplink. The 5G NR supports a frame structure with multiple subcarrier widths in uplink (UL) or downlink (DL). Also, 5G NR supports signals with different subcarrier widths, which may be multiplexed in the of time and frequency.

Physical Uplink Control Channel (PUCCH) carries uplink control information (UCI) such as, but not limited to 1-bit hybrid automatic repeat request (HARQ) Acknowledge (ACK)/Negative ACK (NACK), scheduling request (SR) and 2-bit control information. Short duration PUCCH uses the OFDM symbol located at the end of the downlink sub-frame to convey 1-2-bit feedback with low latency. The ACK/NACK are sent by the user equipment (UE) upon receiving the data from the base station (BS). The ACK represents successful reception of the data from the BS and the NACK represents unsuccessful reception of the data from the BS.

FIG. 1 shows a block diagram illustrating a conventional communication system (100) for transmitting uplink data. As shown in FIG. 1, the communication system 100 includes a Zadoff-chu (ZC) encoder 102, sub-carrier mapping module 104 and an output module 106. The ZC encoder 102 is configured to receive an input data 108/control data and generate an encoded data. For example, let the input data 108 be a 2-bit control data, which is encoded by the ZC encoder 102 to generate one of the 4 Zadoff-chu (ZC) sequences. Each Zadoff-chu sequence is a cyclic shift of a previous sequence.

The subcarrier mapping module 104 receives the ZC sequence and is mapped to a set of subcarriers to generate mapped data in frequency domain. Thereafter, the output module 106 performs the of inverse Fast Fourier transform (IFFT) and cyclic prefix (CP) addition operations on the mapped data to generate an output data 110 for transmitting.

A receiver collects the ZC frequency domain subcarriers of interest and cross correlates with each of 4-ZC sequences and selects a sequence that has a maximum value of the cross-correlation value. Since, two bits are mapped to one of 4 sequences, the receiver can decide the bits associated with the ZC sequence for which the correlation value is maximum.

The PAPR of ZC sequences is more than 3 dB. Thus, a UE requires more power to transmit the control data using the conventional techniques.

In general, it is difficult to determine sequences that have zero cross correlation and have very low PAPR value. Therefore, there exists a need to design a waveform with low PAPR, so that, the PAPR delivers maximum possible power and network link may have enhanced coverage.

The information disclosed in this background of the disclosure section is only for enhancement of understanding of the general background of the invention and should not be taken as an acknowledgement or any form of suggestion that this information forms the prior art already known to a person skilled in the art.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

An embodiment of the present disclosure discloses a transmitter and a method for transmitting control data as waveforms having low peak average to power ratio (PAPR). The transmitter receives a control data. The transmitter comprises a plurality of sequences or code words representing the control data. The plurality of sequences may be binary phase shift keying (BPSK) code words. Further, the plurality of sequences is generated such that each sequence results in a waveform that is orthogonal to the waveforms of other sequence among the plurality of sequences. Each sequence has a predefined bit length and is associated with control data having at least 1-bit length. Further, one sequence is selected from the plurality of sequences which corresponds to control data configured to be transmitted. The selected sequence is rotated and pre-coded to generate the pre-coded sequence. The pre-coded sequence is transformed to frequency domain pre-coded sequence by applying DFT. Further, modulated waveform having reduced peak average to power ratio (PAPR) is generated upon processing the frequency domain pre-coded sequence. The modulated waveform is then transmitted on a Physical Uplink Control Channel (PUCCH). In an embodiment, the waveforms are Orthogonal Frequency Division Multiplexing (OFDM) waveforms.

An embodiment of the present disclosure discloses a receiver and a method for receiving waveforms having low PAPR. The receiver receives one or more Orthogonal Frequency Division Multiplexed (OFDM) waveforms on a PUCCH. Each of the one or more OFDM waveforms may correspond to the sequence representing control data. The sequence is associated with control data having at least 1-bit length. The receiver may process the one or more OFDM waveforms for retrieving the sequence from the one or more OFDM waveforms. The sequence is correlated with a plurality of sequences stored in a memory associated with the receiver. The plurality of sequences is associated with control data having at least 1-bit length. Based on the correlation, the control data is identified.

An embodiment of the present disclosure discloses a transmitter and a method for transmitting control data as waveforms having low peak average to power ratio (PAPR) in time domain. The transmitter receives control data. A plurality of sequences or code words representing the control data is stored in the transmitter. The input plurality of sequences may be binary phase shift keying (BPSK) code words. Further, the plurality of sequences is generated such that each sequence results in a waveform that is orthogonal to the waveforms of others sequences among the plurality of sequences. Each sequence has a predefined bit length and is associated with control data having at least 1-bit length. Further, one sequence is selected from the plurality of sequences which corresponds to control data configured to be transmitted. The selected sequence is rotated and pre-coded to generate one pre-coded sequence. The pre-coded sequence is transformed to one frequency domain pre-coded sequence by applying DFT. Further, modulated waveform having reduced peak average to power ratio (PAPR) is generated upon processing the frequency domain pre-coded sequence. The modulated waveform is then transmitted on a Physical Uplink Control Channel (PUCCH). In an embodiment, the waveforms are Orthogonal Frequency Division Multiplexing (OFDM) waveforms.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
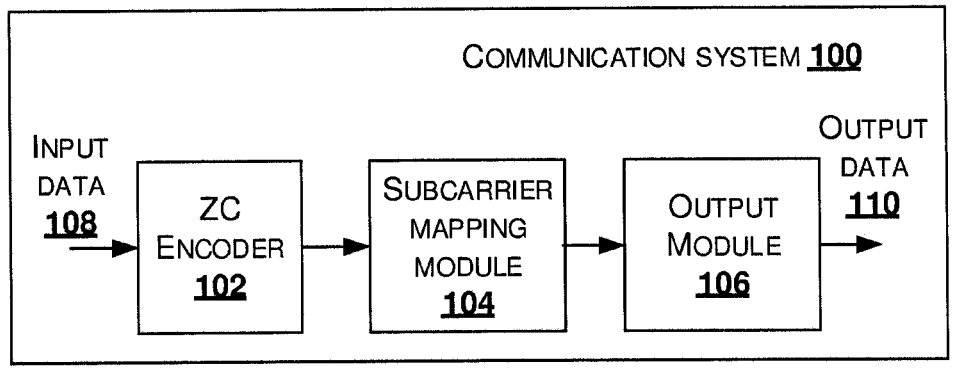
FIG. 1 shows a block diagram illustrating a conventional communication system for transmitting data.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

One embodiment of the present disclosure is related to generating and transmitting waveforms having low peak average to power ratio (PAPR). A transmitter receives a control data (for example acknowledgement/no-acknowledgement). The transmitter comprises a plurality of sequences or code words representing the control data.

"Plurality of sequences" and "code words" are used interchangeably. In an embodiment, a sequence is selected from the plurality of sequences and a waveform is generated for transmitting to a receiver. The transmitted waveform indicates the control data configured to be transmitted. In an embodiment, the waveforms generated from the plurality of sequences are orthogonal to each other. Each sequence has a predefined length. The sequence is associated/mapped to control data (1-bit or 2-bit or N-bit). The transmitter is configured to transmit an appropriate waveform for communicating control data to a receiver communicatively associated with the transmitter. The transmitter selects the sequence indicating the control data configured to be transmitted. The selected the sequence is rotated and pre-coded to generate a pre-coded sequence. In an embodiment, the pre-coded sequence results in a waveform with low PAPR value. The pre-coded sequence processed to generate corresponding modulated waveform which is then transmitted on the PUCCH. In an embodiment, the modulated waveform is transmitted as OFDM waveform.

Another embodiment of the present disclosure is related to a receiver. The receiver receives the one or more OFDM waveforms comprising the sequence indicating control data. The receiver processes the one or more OFDM waveforms to obtain the sequence. Thereafter, the receiver correlates the sequence with a plurality of sequences stored in a memory associated with the receiver. In an embodiment, the plurality of sequences or code words stored in the memory is generated by the receiver, and each code word is associated with control data. A correlation coefficient is determined for each correlation. The sequence from the plurality of sequences for which the coefficient of correlation is having a peak value is identified and the corresponding control data is determined. Thus, the control data is detected by the receiver.

Figure 2:
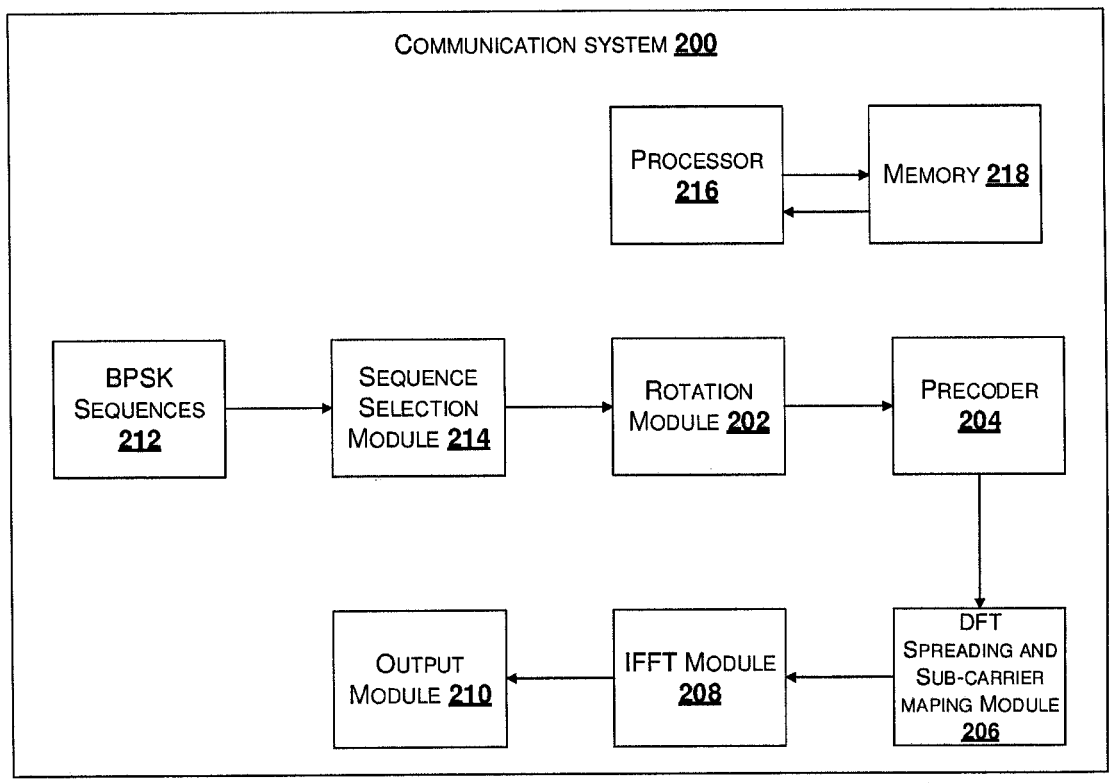
FIG. 2 shows an exemplary block diagram of a communication system for transmitting control data having low PAPR in time domain, in accordance with an embodiment of the present disclosure.

FIG. 2 shows a block diagram of a communication system for transmitting control data in a communication network, in accordance with an embodiment of the present disclosure. The communication system 200 is also referred as a transmitter.

As shown in FIG. 2A, the communication system 200 comprises a rotation module 202, a precoder 204, a discrete Fourier transform (DFT) spreading and subcarrier mapping module 206, an inverse fast Fourier transform (IFFT) module 208 that adds CP an output module 210, a sequence selection module 214, a processor 216 and a memory 218. In an embodiment, the processor 216 may comprise different modules for performing various functions as disclosed in the present disclosure. In an embodiment, the modules may comprise the sequence selection module 214, the rotation module, the precoder 204, the DFT and sub-carrier mapping module 206, IFFT module 208 and the output module 210. In an embodiment, the communication system 200 may be a transmitter in this illustration. The transmitter 200 receives control data as input. The sequence selected is indicative of associated control data. In another embodiment, the waveforms generated by input sequences are orthogonal to each other. In an embodiment, for transmitting control data having length "N", $2^N$ sequences or code words are generated.

For example, from the generated $2^N$ sequences, 30 groups of sequences or code words are formed such that each group comprises 6 sequences that result in orthogonal waveforms. In one embodiment the 6 orthogonal waveforms may be allocated to 3 user equipment (UE) such that each UE is provided with 2 orthogonal waveforms. The 3 UEs may transmit control information simultaneously. One of 2 orthogonal waveforms of a UE may represent a control bit 1 and the other sequence may represent control bit 0.

Generally, bit 1 is associated with the control status acknowledge (ACK) and the bit 0 is associated with control status no-acknowledge (NACK). In an embodiment, a base station (BS) acts as a master and each UE acts as slaves. In an embodiment, the BS may allocate each UE with specific sequences. For example, the BS may allocate first two sequences from 6 sequences to UE1 and subsequent two sequences to UE 2 and remaining two sequences to UE3. The sequence selection module 214 selects the sequence allocated for conveying the corresponding control bit. A computer search is performed to generate the 30 groups of sequences or code words. In one embodiment each BS is allocated one index that is the group index that takes one of 30 values and the UE is allocated sequence index that takes one of 3 values. The group and sequence indices are communicated to the UE using a control channel. To communicate 2 bits comprising of the 4-bit pairs 00,01,10,11, the BS may allocate 4 sequences to a UE that has 4 orthogonal waveforms.

The rotation module 202 performs a constellation rotation operation on the selected sequence. In an embodiment the constellation rotation is 90 degrees between successive elements of the sequence. For example, considering the input BPSK sequence is of length Q=2 for 1-bit feedback (ACK/NACK) and Q=4 for 2-bit feedback. The rotation module 202 performs $j^k$ rotation on the selected sequence to generate rotated sequence. The rotated sequence is fed to a precoder 204, which pre-codes the selected rotated sequence. The precoder 204 performs one of $$H(D) = 1 + D, \text{ where } D \text{ is a delay element}$$

$$H(D) = 1 - D.$$

In an embodiment, considering time domain, the precoder 204 represents a circular convolution of input with a two-tap filter, where the two taps have equal values. The precoder 204 reduces PAPR of the waveform generated by the selected sequence significantly. The precoder 204 output is a pre-coded data, which is fed to the DFT spreading and sub-carrier mapping module 206. The discrete Fourier transform (DFT) spreading and subcarrier mapping module 206 is also referred as a DFT module.

The DFT module 206 performs a DFT spreading and subcarrier mapping on the pre-coded sequence, and the output of the DFT module is mapped to contiguous or distributed subcarriers generating the modulated waveforms. The DFT module 206 performs an M-point DFT operation on a sequence $x_n$ that may be defined as illustrated below:

$$X_k = \sum_{i=0}^{M-1} x_n e^{\frac{-i2\pi kn}{M}}, k = 0, 1, 2, \ldots, M-1 \; i = \sqrt{-1} \tag{1}$$

In an embodiment, considering the precoder 204 is a 1+D precoder, then the DFT module 206 performs a subcarrier mapping such that the DFT is taken over the range 0, ..., M−1, then the left half of DFT output will be swapped with right half. In another embodiment, if the precoder 204 is a 1−D precoder and if the DFT is taken over the range 0, ..., M−1, then the output of the DFT module 206 output will be directly mapped to one of contiguous and distributed subcarriers. The output of the 210 may be referred as OFDM waveforms.

The IFFT module 208 is also referred as an inverse DFT (IDFT) module, which is configured to perform an inverse transform of the frequency domain signals to generate a time domain signals. After an IFFT operation, the output module 210 performs the of addition of cyclic prefix, cyclic suffix, windowing, windowing with overlap and adding operation (WOLA) on the time domain signal to generate output sequence 214. A half subcarrier frequency shift may be applied to avoid DC transmission. In an embodiment, the output sequence 214 may be fed to the digital to analog converter to generate an analog waveform. The output sequence 214 is the of 1-bit control data and 2-bit control data for short duration physical uplink control channel (PUCCH), in an embodiment.

In an embodiment, the transmitter 200 combines pi/2 BPSK with 1+D precoding, to generate Quadrature Phase Shift Keying (QPSK) constellation, which is provided as input to the DFT module 206. There are Q-QPSK sequences with 1-1 mapping corresponding to the Q-input BPSK sequences.

In an embodiment, if the precoder 204 is configured with 1+D precoding, then left half of the M-point DFT of the QPSK sequences is swapped with the right half, before performing subcarrier mapping. The swapping of subcarriers before subcarrier mapping results in 1−D precoding. In another embodiment, if the precoder is configured with 1−D precoding, then the M-point DFT of QPSK sequence is performed before subcarrier mapping.

In an embodiment, the transmitter 200 may directly store the frequency domain sequences or frequency domain code words generated by the DFT outputs in memory. For 1-bit control transmission the transmitter selected one of two stored frequency domain sequences and feeds the sequences to subcarrier mapping module followed by IFFT and the of addition of cyclic prefix, cyclic suffix, windowing, windowing with overlap and adding operation (WOLA) on the time domain signal to generate output sequence that may be further fed to digital to analog converter (DAC) to generate an analog waveform. In an embodiment, for 2-bit control transmission, the transmitter selected one of 4 stored frequency domain sequences.

Figure 3:
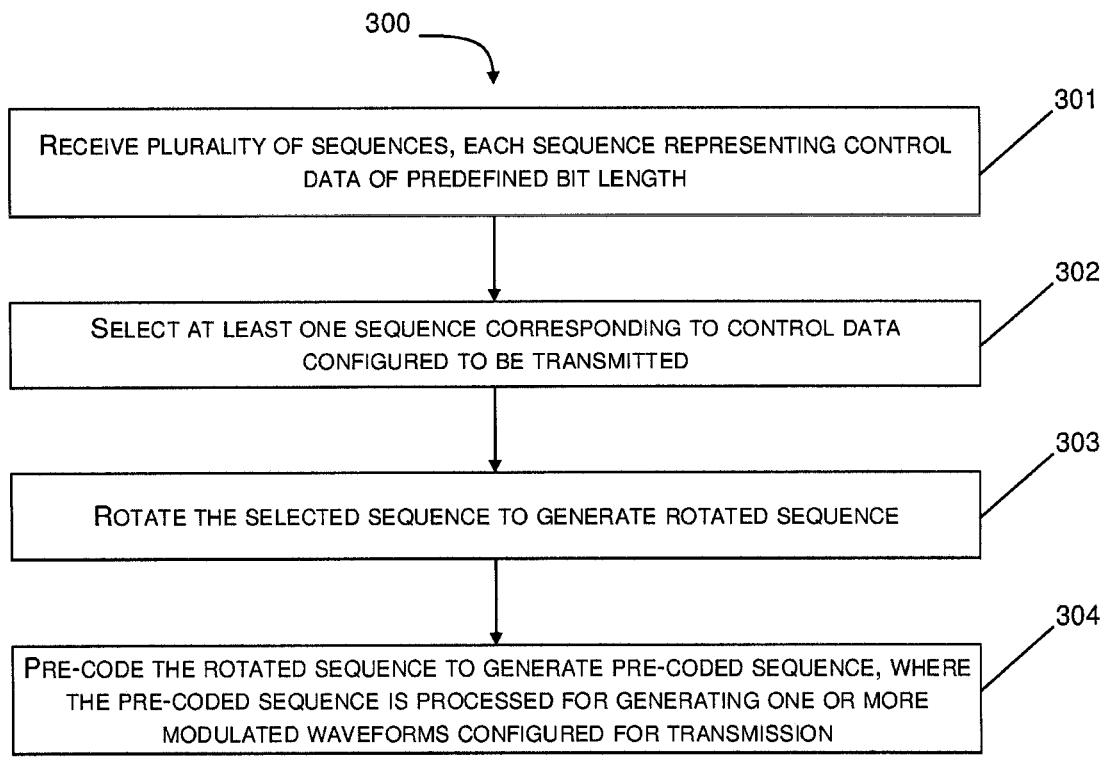
FIG. 3 shows a flow chart illustrating a method of transmitting control data having low PAPR in a communication network, in accordance with embodiments of the present disclosure.

FIG. 3 shows a flow chart illustrating a method for generating and transmitting low PAPR waveforms, in, in accordance with some embodiments of the present disclosure.

As illustrated in FIG. 3, the method 300 may comprise one or more steps to enable generate and transmit low PAPR waveforms, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, an input module (not shown) of the transmitter 200 receives control information. The plurality of sequences or code words representing the control data having a predefined bit length is stored in the memory 218. Each waveform generated by the sequence is orthogonal to each other sequence.

At step 302, the sequence selection or code word selection module 214 selects sequence for transmitting corresponding control bit. In an embodiment, the plurality of the sequence may be stored in a memory associated with the memory 218. The sequence selection module 214 selects the sequence from the plurality of sequences for transmitting control data that is configured to be transmitted.

At step 303, the selected the sequence is rotated to generate corresponding rotated sequence. The rotation module 202 performs a constellation rotation operation on the selected sequence. In an embodiment the constellation rotation is 90 degrees between successive elements of the sequence.

At step 304, the pre-coder 204 applies pre-coding filter on the rotated sequence to generate corresponding pre-coded sequences. In an embodiment, the pre-coder performs one of 1+D precoding or 1−D precoding. The pre-coded sequences have low PAPR.

At step 305, the output module 210 a is waveform is generated upon processing the pre-coded sequences. In an embodiment, the pre-coded sequence is passed through a DFT module 206 to generate frequency domain sequence. The frequency domain sequences are then mapped to one or more sub-carriers. In another embodiment, the frequency domain sequence, after subcarrier mapping is passed through the IFFT module 208 to transform into discrete-time domain signals. The discrete-time domain waveforms are converted to analog signal using analog-to-digital converter. The output module 210 transmits the OFDM waveform on the PUCCH.

In an exemplary embodiment, Table 1 illustrates generated sequence codes using 1−D precoding for 12 input sequences (M=12).

TABLE 1

| PAPR input sequences (dB) | (binary code word) | Pi/2 BPSK after 1 + D precoding | DFT output (or frequency domain code word) |
|---|---|---|---|
| 1.44 | 1 0 0 0 0 0 1 0 1 1 1 0 | 1 − i, −1 − i, 1 + i, −1 + i, −1 − i, 1 − i, −1 + i, 1 + i, 1 − i, −1 + i, −1 − i, 1 + i | 0, 0, 4.7321 − 2.7321i, −2 − 2i, −4.7321 + 8.1962i, 0, −4i, 7.4641 − 2i, −1.2679 − 2.1962, 6 − 6i, 1.2679 + 0.7321i, 0.5359 − 2i |
| 1.86 | 1 0 0 0 1 0 0 0 0 0 0 1 | 1 + i, −1 − i, 1 + i, −1 + i, 1 − i, −1 − i, 1 + i, −1 + i, −1 − i, 1 − i, 1 + i, −1 − i | 0, 2 + 0.5359i, 0.7321 + 2.7321i, −6 − 6i, 4.7321 + 1.2679i, 2 + 7.4641i, 8 + 4i, 0, 1.2679 + 4.7321i, 2 − 2i, −2.7321 − 0.7321i, 0 |

TABLE 1-continued

| PAPR (dB) | input sequences (binary code word) | Pi/2 BPSK after 1 + D precoding | DFT output (or frequency domain code word) |
|---|---|---|---|
| 1.44 | 0 0 1 0 0 0 0 1 0 1 0 0 | −1 − i, 1 − i, −1 + i, 1 + i, −1 − i, 1 − i, 1 + i, −1 − i, −1 + i, 1 + i, 1 − i, −1 + i | 0 − 2 − 0.5359i, 0.7321 − 1.2679, −6 − 6i, −2.11962 + 1.2679i, −2 − 7.4641i, −4, 0, 8.1962 + 4.7321i, −2 + 2i, −2.7321 − 4.7321i, 0 |
| 1.44 | 1 0 1 0 1 1 1 1 0 1 1 1 | 1 + i, −1 − i, −1 + i, 1 + i, 1 − i, −1 + i, −1 − i, 1 − i, −1 + i, 1 = I, −1 − i, 1 − i | 0, 2 + 0.5359i, 0.7321 − 1.2679i, 6 + 6i, −2.1962 + 1.2679i, 2 + 7.4641i, −4, 0, 8.1962 + 4.7321i, 2 − 2i, −2.7321 − 4.7321i, 0 |

In an exemplary embodiment, Table 2 illustrates generated sequence codes using 1–D precoding for 12 input sequences (M=12).

TABLE 2

| PAPR (dB) | input binary sequences (binary code word) | Pi/2 BPSK after 1 + D precoding | DFT output (or frequency domain code word) |
|---|---|---|---|
| 1.2 | 0 0 0 1 1 1 1 1 0 1 0 0 | −1 − i, 1 − i, 1 + i, −1 − i, 1 + i, −1 − i, 1 − i, −1 + i, 1 + i, 1 − i | 0, 0.7321 + 0.7321i, −4.7321 − 4.7321i, 0, −8.1962 − 8.1982i, −2.7321 + 2.7321i, 0, 4.7321 − 4.7321i, 2.1962 + 2.1962i, −4 + 4i, −1.2679 − 1.2679i, 1.2679 − 1.2679i |
| 1.22 | 0 0 1 0 1 1 0 0 0 1 1 1 | −1 + 1, 1 − i, −1 + 1, 1 + 1, 1 − i, −1 + i, 1 − i, −1 + i, −1 − i, 1 + i, −1 − i, 1-i | 0, 2.1962(1 − i), 0.7321(1 + 0), 0, 1.2679(1 + i), −8.1982(1 + i), −4(1 + i), −4.7321(1 − i), 4.7321(1 + i), 0, −2.7321(1 + i), −1.2679(1 − i) |
| 1.17 | 0 1 1 0 0 0 1 1 0 1 0 1 | −1 + i, 1 + i, −1 − i, 1 + i, −1 − i, 1 − i, −1 + i, 1 − i, −1 + i, 1 + i, 1 − i, −1 − i | 0, −1.4641(1 + i), 1.1641, 0, 2.5359i, 5.441(1 − i), −8, 0, 9.4641i, −4(1 − i), −5.4641, 0 |
| 1.8 | 1 1 1 0 1 1 0 1 0 0 0 0 | 1 − i, −1 − i, −1 − i, 1 + i, 1 − i, −+i, 1 − i, −1 − i, −1 + i, 1 − i, 1 + i, −1 + i | 0, −0.4641 + 1.7321 −3.7321 + 2.4641, 0, 4.2679 − 6.4641i, 6.4641 − 1.7321i, 4(1 − i), −6.4641 − 1.7321i, 7.7321 + 0.4641, 0, −0.2679 − 4.4641i, 0.4641 + 1.7321i |

In an exemplary embodiment, Table 3 illustrates generated sequence codes using 1–D precoding for 12 input sequences (M=12).

TABLE 3

| PAPR (dB) | input sequences (input binary code word) | Pi/2 BPSK after 1 + D precoding | DFT output (or frequency domain code word) |
|---|---|---|---|
| 1.86 | 0 1 1 1 0 1 1 0 0 1 0 1 | −1 + i, 1 + i, −1 − i, 1 − i, −1 + i, 1 + i, −1 − i, 1 + i, −1 − i, 1 + i, 1 − i, −1 − i | 0, 0, −2(1 − i), 2(1 + i), 3.4641(1 − i), 0, −8 − 4i, 5.4641(1 + i), −3.4641(1 − i), −6(1 − i), −2(1 − i), −1.4641(1 + i) |
| 1.49 | 1 1 1 1 1 0 1 0 1 1 1 0 | 1 − i, −1 + i, −1 − i, 1 − i, 1 + i, −1 − i, −1 + i, 1 + i, 1 − i, −1 + i, −1 − i, 1 + i | 0, −1.2679(1 + i), 2i, 6(1 + i), 3.4641, −4.7321(1 + i), −4i, 4.7321(1 − i), −3.4641, 6(1 − i), 2i, 1.2679(1 − i) |
| 1.48 | 1 1 0 1 0 0 0 0 0 0 1 1 | 1 + i, −1 + i, 1 − i, −1 − i, −1 + i, 1 − i, 1 + i, −1 + i, −1 − i, 1 − i, −1 + 1, 1 − i | 0, 1 + 0.2679i, 3 + 5.7321i, −2(1 + i), 9.9282 + 5.1962i, 1 + 3.7321i, 4i, 1 − 3.7321i, −3.9282 − 5.1962i, −1(1 − i), 3 + 2.2679i, 1 − 0.2689i |
| 1.988 | 0 1 1 0 0 0 1 1 1 0 1 1 | −1 + i, 1 + i, −1 − i, 1 + i, −1 − i, 1 − i, −1 + i, 1 + i, −1 − i, −1 + i, 1 − i | 0, −1.4641(1 − i), 2.7321 − 0.7321i, 2(1 + i), −1.2679 + 4.7321i, 5.4641(1 − i), −8 + 4i, −7.4641 + 2i, −4.7321 + 1.2679i, 2(1 − i), −0.7321 + 2.7321i, −0.5359 + 2i |

In an exemplary embodiment Table 4 illustrates generated sequence codes using 1–D precoding for 12 input sequences (M=12).

TABLE 4

| PAPR (dB) | input binary sequences (binary code word) | Pi/2 BPSK after 1 + D precoding | DFT output (or frequency domain code word) |
|---|---|---|---|
| 0.64881 | 0 1 1 1 1 1 1 1 1 0 0 0 | −1 − i, 1 + i, −1 − i, 1 − i, 1 + i, −1 + i, −1 − i, 1 − i, 1 + i, −1 − i, 1 + i, −1 + i | 0, −1.7321 + 0.4641i, −6.4641 − 1.7321i, 4(1 + i), −3 − 11.1962i, 1.7321 − 6.4641i, 0, −3.7321 + I, −3.0000 − 0.8038i, 0, 0.4641 + 1.7321i, −0.2679 + 1.0000i |
| 1.5 | 1 0 0 1 0 0 1 1 1 0 0 1 | 1 + i, −1 − i, 1 + i, −1 − i, −1 + i, 1 − i, −1 + i, 1 − i, 1 + i, −1 − i, 1 + i, −1 − i | 0, −0.4641 + 1.7321i, 1.0000 − 1.7321i, 0, −3 + 1.7321i, 6.4641 − 1.7321i, 4. + 12i, 6.4641 + 1.7321i, −3 − 1.7321i, 0, 1. + 1.7321i, −0.4641 − 1.7321i |
| 1.7422 | 1 0 1 0 0 1 0 0 1 0 0 0 | 1 − i, −1 − i, −1 + i, 1 + i, −1 − i, 1 + i, 1 − i, −1 + i, 1 − i, −1 − i, 1 + i, −1 + i | 0, −0.7321 + 0.7321i, −0.7321 + 0.7321i, −4.0000 − 4.0000i, 1.2679 − 1.2679i, 2.7321 − 2.7321i, 4.0000 − 4.0000i, 0.7321 + 10.1962i, 4.7321 − 4.7321i, 4.0000 − 4.0000i, 2.7321 − 2.7321i, −2.7321 − 0.1962i |
| 1.13 | 1 1 1 1 0 1 0 1 1 1 1 1 | 1 + i, −1 + i, −1 − i, 1 − i, −1 + i, 1 + i, 1 − i, −1 + i, 1 + i, −1 + i, −1 − i, 1 − i | 0, −1.0000 − 0.2679i, 3.0000 + 1.7321i, 8.0000 + 8.0000i, 3.0000 + 5.1962i, −1.0000 − 3.7321i, 0 − 1.0000 + 3.7321i, 3.0000 − 5.1962i, −4.0000 + 4.0000i, 3.0000 − 1.7321i, −1.0000 + 0.2679i |

In an exemplary embodiment Table 5 illustrates generated sequence codes using 1–D precoding for 12 input sequences (M=12).

TABLE 5

| PAPR (dB) | input sequences (binary code word) | Pi/2 BPSK after 1 + D precoding | DFT output (or frequency domain code word) |
|---|---|---|---|
| 1.476 | 1 0 1 1 1 1 1 1 0 0 0 0 | 1 − i, −1 − i, −1 + i, 1 − i, 1 + i, −1 + i, 1 − i, 1 − i, −1 + i, 1 − i, 1 + i, −1 + i | 0, 0.2679 + 1.0000i, −6.4641 − 0.2679i, 2.0000 + 2.0000i, −0.4641 − 11.1962i, 3.7321 + 1.0000i, −0.0000 + 4.0000i, 3.7321 − 1.0000i, 6.4641 − 0.8038i, 2.0000 − 2.0000i, 0.4641 − 3.7321i, 0.2679 − 1.0000i |
| 1.86 | 0 0 0 1 0 0 1 1 0 1 0 1 | −1 + i, 1 − i, 1 + i, −1 − i, −1 + i, 1 − i, −1 + i, 1 − i, −1 + i, 1 + i, 1 − i, −1 − i | 0, 0, 0.7321 − 2.7321i, −2.0000 − 2.0000i, −4.7321 + 1.2679i, 0, −4.0000 + 8.0000i, 7.4641 − 2.0000i, −1.2679 + 4.7321i, −6.0000 + 6.0000i, −2.7321 + 0.7321i, 0.5359 − 2.0000i |
| 0.97 | 1 1 0 0 0 0 1 1 1 0 0 0 | 1 − i, −1 + i, 1 − i, −1 + i, −1 − i, 1 − i, −1 + i, 1 − i, 1 + i, −1 − i, 1 + i, −1 + i | 0, −1.9282 + 3.1962i, 1.0000 − 1.7321i, −2.0000 − 2.0000i, −3.0000 + 1.7321i, 11.9282 − 7.1962i, 4.0000 + 0.0000i, 1.0000 − 3.7321i, −3.0000 − 1.7321i, 2.0000 − 2.0000i, 1.0000 + 1.7321i, 1.0000 − 0.2679i |
| 1.89 | 0 0 1 0 0 1 1 0 1 1 0 0 | −1 − i, 1 − i, −1 + i, 1 + i, −1 − i, 1 + i, −1 − i, 1 + i, −1 + i, 1 −i, −1 + i | 0, −1.0000 − 0.2679i, −1.0000 − 3.7321i, −2.0000 − 2.0000i, −6.4641 − 1.7321i, −1.0000 − 3.7321i, 4.0000 − 8.0000i, 4.4641 + 9.1962i, 0.4641 + 1.7321i, 2.0000 − 2.0000i, −1.0000 − 0.2679i, −2.4641 − 1.1962i |

TABLE 5-continued

| PAPR (dB) | input sequences (binary code word) | Pi/2 BPSK after 1 + D precoding | DFT output (or frequency domain code word) |
|---|---|---|---|
| 1.86 | 1 1 0 1 0 1<br>0 0 0 1 0 0 | 1 − i, −1 + i, 1 − i, −1 − i, −1 + i, 1 + i, 1 − i, −1 + i, −1 − i, 1 + i, 1 − i, −1 + i, | 0, 0, 0.7321 + 2.7321i, −2.0000 − 2.0000i, 4.7321 − 1.2679i, 0.0000 + 0.0000i, 4.0000 − 8.0000i, 7.4641 − 2.0000i, |
| 1.51 | 1 0 0 1 1 0<br>1 0 1 1 1 0 | 1 − i, −1 − i, 1 + i, −1 − i, 1 + i, −1 − i, −1 + i, 1 + i, 1 − i, −1 + i, −1 − i, 1 + i | 0, 0.4641 −1.7321i, 1.0000 − 1.7321i, 2.0000 + 2.0000i, −3.0000 + 1.7321i, −6.4641 + 1.7321i, 4.0000 + 0.0000i, 8.4641 − 5.7321i, −3.0000 − 1.7321i, 6.0000 − 6.0000i, 1.0000 + 1.7321i, 1.5359 − 2.2679i |
| 1.82 | −1 1 1 1<br>−1 −1 1 −1<br>−1 −1 1 −1 | −1 − i, 1 − i, −1 − i, 1 − i, −1 + i, 1 − i, −1 + i, 1 + i, −1 − i, 1 − i, −1 + i, 1 + i | 0, −1.0000 − 0.2679i, −1.7321 + 3.0000i, −2.0000 − 2.0000i, 5.1962 − 3.0000i, −1.0000 − 3.7321i, −12.0000 + 0.0000i, 1.0000 − 3.7321i, −5.1962 − 3.0000i, 2.0000 − 2.0000i, 1.7321 + 3.0000i, 1.0000 − 0.2679i |
| 1.4761 | 1 −1 1 −1<br>−1 −1 −1 1<br>−1 1 1 −1 | 1 − i, −1 − i, −1 + i, 1 + i, −1 − i, 1 − i, 1 + i, −1 − i, −1 + i, 1 + i, −1 − i, 1 + i | 0, −1.0000 − 0.2679i, 3.7321 + 0.4641i, −2.0000 − 2.0000i, 0.8038 + 6.4641i, −1.0000 − 3.7321i, −4.0000 + 0.0000i, 2679 − 6.4641i, 1.0000 − 0.2679i |
| 1.47 | 1 1 1 −1<br>1 −1 1 −1<br>−1 1 −1 1 | 1 + i, −1 + i, −1 − i, 1 + i, 1 − i, −1 − i, −1 + i, 1 + i, −1 − i, 1 + i, 1 − i, −1 − i | 0, 0.2679 + 1.0000i, 0.4641 + 3.7321i, 2.0000 + 2.0000i, 6.4641 + 0.8038i, 3.7321 + 1.0000i, −0.0000 − 4.0000i, 3.7321 − 1.0000i, −0.4641 + 11.1962i, 2.0000 − 2.0000i, −6.4641 + 0.2679i, 0.2679 − 1.0000i |
| 0.9762 | −1 1 1 1<br>1 −1 −1 1<br>1 1 −1 −1 | −1 − i, 1+ i, −1 − i, 1 − i, 1 + i, −1 − i, 1 + i, −1 − 1, 1 + i, −1 + i, 1 − i, −1 + i | 0, −3.2679 − 1.8038i, −2.0000 + 0.0000i, 2.0000 + 2.0000i, 0.0000 − 3.4641i, −6.7321 − 12.1962i, 4.0000 + 0.0000i, −2.7321 − 2.7321i, 0.0000 + 3.4641i, −2.0000 + 2.0000i, −2.0000 + 0.0000i, 0.7321 + 0.7321i |
| 1.3699 | 1 1 1 1<br>−1 1 1 1<br>1 1 1 1 | 1 + i, −1 + i, −1 − i, 1 − i, −1 + i, 1 + i, −1 − i, 1 − i, 1 + i, −1 + i, −1 − i, 1 − i | 0, −0.7321 + 0.7321i, 2.0000 + 0.0000i, 10.0000 + 10.0000i, 0.0000 + 3.4641i, 2.7321 − 2.7321i, −4.0000 + 0.0000i, 2.7321 + 2.7321i, 0.0000 − 3.4641i, −2.0000 + 2.0000i, 2.0000 − 0.00001, −0.7321 − 0.7321i |
| 1.89 | −1 1 −1 −1<br>1 1 1 1<br>−1 1 1 −1 | −1 − i, 1 + i, 1 − i, −1 + i, 1 − i, −1 + i, −1 − i, 1 − i, −1 + i, −1 + i, −1 − i, 1 + i | 0, 1.0000 + 0.2679i, −1.0000 − 3.7321i, 2.0000 + 2.0000i, −6.4641 − 1.7321i, 1.0000 + 3.7321i, −4.0000 − 8.0000i, −4.4641 − 9.1962i, 0.4641 + 1.7321i, −2.0000 + 2.0000i, −1.0000 − 0.2679i, 2.4641 + 1.1962i |

In an exemplary embodiment, Table-6 shows 6 semi-orthogonal sequence codes for 1+D precoding and M=12

TABLE 6

| input binary sequences (binary code words) | 1 + D output | DFT output (or frequency domain code word) |
|---|---|---|
| 0 0 0 1 1 1<br>1 1 0 0 0 0 | −1.0000 + 1.0000i<br>−1.0000 − 1.0000i<br>1.0000 − 1.0000i<br>1.0000 − 1.0000i | 0.0000 − 4.0000i<br>1.0000 − 3.7321i<br>−6.4641 + 11.1962i<br>−2.0000 + 2.0000i |
| | 1.0000 − 1.0000i<br>1.0000 + 1.0000i<br>1.0000 + 1.0000i<br>−1.0000 − 1.0000i<br>−1.0000 − 1.0000i | −6.4641 + 3.7321i<br>1.0000 − 0.2679i<br>0.0000 + 0.0000i<br>1.0000 + 0.2679i<br>0.4641 + 0.2679i |

TABLE 6-continued

| input binary sequences (binary code words) | 1 + D output | DFT output (or frequency domain code word) |
|---|---|---|
| | −1.0000 − 1.0000i | −2.0000 − 2.0000i |
| | 1.0000 − 1.0000i | 0.4641 + 0.8038i |
| | 1.0000 + 1.0000i | 1.0000 + 3.7321i |
| 0 0 1 1 0 0 | −1.0000 − 1.0000i | −4.0000 − 8.0000i |
| 1 1 1 1 0 1 | −1.0000 − 1.0000i | −2.0000 + 7.4641i |
| | −1.0000 − 1.0000i | −4.7321 − 1.2679i |
| | −1.0000 − 1.0000i | 2.0000 − 2.0000i |
| | −1.0000 − 1.0000i | 0.7321 + 2.7321i |
| | −1.0000 − 1.0000i | −2.0000 + 0.5359i |
| | −1.0000 − 1.0000i | 0.0000 + 0.0000i |
| | −1.0000 − 1.0000i | −1.4641 + 1.4641i |
| | 1.0000 − 1.0000i | −2.7321 − 0.7321i |
| | 1.0000 + 1.0000i | −2.0000 − 2.0000i |
| | 1.0000 + 1.0000i | −1.2679 − 4.7321i |
| | 1.0000 − 1.0000i | 5.4641 − 5.4641i |
| 0 1 0 1 0 1 | −1.0000 + 1.0000i | 4.0000 + 8.0000i |
| 0 0 1 1 0 0 | −1.0000 + 1.0000i | −4.7321 + 4.7321i |
| | 1.0000 + 1.0000i | −1.2679 + 1.2679i |
| | 1.0000 − 1.0000i | −2.0000 + 2.0000i |
| | −1.0000 − 1.0000i | −0.7321 + 0.7321i |
| | −1.0000 + 1.0000i | −1.2679 + 1.2679i |
| | 1.0000 + 1.0000i | 0.0000 + 0.0000i |
| | 1.0000 + 1.0000i | −0.7321 + 0.7321i |
| | 1.0000 + 1.0000i | 2.7321 − 2.7321i |
| | 1.0000 + 1.0000i | −6.0000 − 6.0000i |
| | 1.0000 + 1.0000i | −4.7321 + 4.7321i |
| | 1.0000 + 1.0000i | 2.7321 − 2.7321i |
| 0 1 1 0 1 0 | −1.0000 + 1.0000i | 0.0000 + 4.0000i |
| 0 1 0 1 0 0 | −1.0000 + 1.0000i | −2.0000 + 7.4641i |
| | −1.0000 + 1.0000i | 1.2679 + 2.1962i |
| | −1.0000 + 1.0000i | −2.0000 + 2.0000i |
| | 1.0000 + 1.0000i | −1.2679 − 0.7321i |
| | 1.0000 − 1.0000i | −2.0000 + 0.5359i |
| | 1.0000 −1.0000i | 0.0000 + 0.0000i |
| | 1.0000 −1.0000i | 1.4641 − 1.4641i |
| | −1.0000 − 1.0000i | −4.7321 + 2.7321i |
| | −1.0000 + 1.0000i | −2.0000 − 2.0000i |
| | 1.0000 + 1.0000i | 4.7321 − 8.1962i |
| | 1.0000 + 1.0000i | −5.4641 + 5.4641i |
| 0 0 0 0 0 0 | −1.0000 − 1.0000i | 0.0000 − 4.0000i |
| 0 0 0 0 0 1 | −1.0000 − 1.0000i | 1.0000 − 3.7321i |
| | 1.0000 − 1.0000i | 1.7321 − 3.0000i |
| | 1.0000 + 1.0000i | −10.0000 + 10.0000i |
| | −1.0000 + 1.0000i | 1.7321 − 1.0000i |
| | −1.0000 − 1.0000i | 1.0000 − 0.2679i |
| | 1.0000 − 1.0000i | 0.0000 + 0.0000i |
| | 1.0000 + 1.0000i | −1.0000 − 0.2679i |
| | −1.0000 + 1.0000i | −1.7321 − 1.0000i |
| | −1.0000 − 1.0000i | −2.0000 − 2.0000i |
| | 1.0000 − 1.0000i | −1.7321 − 3.0000i |
| | 1.0000 − 1.0000i | −1.0000 − 3.7321i |
| 0 1 0 1 0 0 | −1.0000 − 1.0000i | −4.0000 − 8.0000i |
| 0 1 0 0 1 1 | −1.0000 + 1.0000i | −0.0000 + 0.0000i |
| | 1.0000 + 1.0000i | 3.4641 − 3.4641i |
| | 1.0000 − 1.0000i | −2.0000 + 2.0000i |
| | 1.0000 − 1.0000i | 2.0000 − 2.0000i |
| | −1.0000 − 1.0000i | 0.0000 − 0.0000i |
| | 1.0000 − 1.0000i | 0.0000 + 0.0000i |
| | 1.0000 − 1.0000i | 1.4641 − 1.4641i |
| | −1.0000 + 1.0000i | 2.0000 − 2.0000i |
| | −1.0000 − 1.0000i | −6.0000 − 6.0000i |
| | −1.0000 − 1.0000i | −3.4641 + 3.4641i |
| | −1.0000 − 1.0000i | −5.4641 + 5.4641i |

In an exemplary embodiment, Table-7 shows 6 semi-orthogonal sequence codes for 1−D precoding and M=12

TABLE 7

| input binary sequences (binary code words) | 1 − D output | DFT output (or frequency domain code word) |
|---|---|---|
| 0 0 0 1 1 1 | −1.0000 − 1.0000i | 0.0000 + 0.0000i |
| 1 1 0 0 0 0 | 1.0000 − 1.0000i | −1.7321 + 0.4641i |
| | −1.0000 + 1.0000i | −3.0000 − 3.7321i |
| | 1.0000 + 1.0000i | −2.0000 − 2.0000i |
| | 1.0000 − 1.00001 | −6.4641 − 5.1962i |
| | −1.0000 − 1.0000i | 1.7321 − 6.4641i |
| | −1.0000 + 1.0000i | 0.0000 + 4.0000i |
| | 1.0000 − 1.0000i | −3.7321 + 1.0000i |
| | 1.0000 + 1.0000i | 0.4641 + 5.1962i |
| | −1.0000 − 1.0000i | 6.0000 − 6.0000i |
| | 1.0000 − 1.0000i | −3.0000 − 0.2679i |
| | −1.0000 + 1.0000i | −0.2679 + 1.0000i |
| 0 0 1 1 0 0 | −1.0000 − 1.0000i | 0.0000 + 0.0000i |
| 1 1 1 1 0 1 | 1.0000 + 1.0000i | −2.0000 − 0.5359i |
| | −1.0000 − 1.0000i | −3.4641 + 2.0000i |
| | 1.0000 − 1.0000i | −2.0000 − 2.0000i |
| | −1.0000 + 1.0000i | 3.4641 − 6.0000i |
| | 1.0000 + 1.0000i | −2.0000 − 7.4641i |
| | 1.0000 − 1.0000i | 0.0000 − 4.0000i |
| | −1.0000 + 1.0000i | −2.0000 + 7.4641i |
| | 1.0000 − 1.0000i | −3.4641 − 6.0000i |
| | −1.0000 − 1.0000i | −2.0000 + 2.0000i |
| | 1.0000 + 1.0000i | 3.4641 + 2.0000i |
| | −1.0000 + 1.0000i | −2.0000 + 0.5359i |
| 0 1 0 1 0 1 | −1.0000 + 1.0000i | 0.0000 + 0.0000i |
| 0 0 1 1 0 0 | 1.0000 + 1.0000i | −0.4641 + 1.7321i |
| | 1.0000 − 1.0000i | 1.7321 − 4.4641i |
| | −1.0000 + 1.0000i | 2.0000 + 2.0000i |
| | −1.0000 − 1.0000i | −7.7321 + 3.0000i |
| | 1.0000 + 1.0000i | 6.4641 − 1.7321i |
| | −1.0000 − 1.0000i | 0.0000 − 4.0000i |
| | 1.0000 − 1.0000i | −1.0000 + 3.7321i |
| | 1.0000 + 1.0000i | −4.2679 + 3.0000i |
| | −1.0000 + 1.0000i | −6.0000 + 6.0000i |
| | 1.0000 − 1.0000i | −1.7321 + 2.4641i |
| | −1.0000 − 1.0000i | −1.0000 + 0.2679i |
| 0 1 1 0 1 0 | 1.0000 + 1.0000i | 0.0000 + 0.0000i |
| 0 1 0 1 0 0 | −1.0000 − 1.0000i | 1.2679 + 1.2679i |
| | −1.0000 − 1.0000i | 2.0000 + 0.0000i |
| | 1.0000 + 1.0000i | 2.0000 + 2.0000i |
| | −1.0000 − 1.0000i | 0.0000 + 3.4641i |
| | 1.0000 + 1.0000i | 4.7321 + 4.7321i |
| | −1.0000 − 1.0000i | −4.0000 + 0.0000i |
| | 1.0000 + 1.0000i | 0.7321 + 10.1962i |
| | 1.0000 − 1.0000i | 0.0000 − 3.4641i |
| | −1.0000 − 1.0000i | 6.0000 − 6.0000i |
| | −1.0000 + 1.0000i | 2.0000 − 0.0000i |
| | 1.0000 − 1.0000i | −2.7321 − 0.1962i |
| 0 0 0 0 0 0 | −1.0000 + 1.0000i | 0.0000 + 0.0000i |
| 0 0 0 0 0 1 | 1.0000 − 1.0000i | 1.0000 + 0.2679i |
| | 1.0000 + 1.0000i | 1.7321 + 1.0000i |
| | −1.0000 + 1.0000i | −10.0000 − 10.0000i |
| | −1.0000 + 1.0000i | 1.7321 + 3.0000i |
| | 1.0000 − 1.0000i | 1.0000 + 3.7321i |
| | 1.0000 + 1.0000i | 0.0000 + 4.0000i |
| | −1.0000 + 1.0000i | −1.0000 + 3.7321i |
| | −1.0000 − 1.0000i | 1.7321 + 3.0000i |
| | 1.0000 − 1.0000i | −2.0000 + 2.0000i |
| | 1.0000 + 1.0000i | −1.7321 + 1.0000i |
| | −1.0000 − 1.0000i | −1.0000 + 0.2679i |
| 0 1 0 1 0 0 | 1.0000 + 1.0000i | 0.0000 + 0.0000i |
| 0 1 0 0 1 1 | 1.0000 − 1.0000i | 1.4641 − 1.4641i |
| | −1.0000 + 1.0000i | −4.0000 + 0.0000i |
| | 1.0000 − 1.0000i | 2.0000 + 2.0000i |
| | 1.0000 + 1.0000i | −0.0000 − 6.9282i |
| | −1.0000 + 1.0000i | −5.4641 + 5.4641i |
| | −1.0000 − 1.0000i | −4.0000 + 0.0000i |
| | 1.0000 + 1.0000i | 5.4641 + 5.4641i |

TABLE 7-continued

| input binary sequences (binary code words) | 1 − D output | DFT output (or frequency domain code word) |
|---|---|---|
| | −1.0000 − 1.0000i | −0.0000 + 6.9282i |
| | 1.0000 + 1.0000i | −2.0000 + 2.0000i |
| | 1.0000 − 1.0000i | −4.0000 − 0.0000i |
| | −1.0000 − 1.0000i | −1.4641 − 1.4641i |

An embodiment of the present is disclosure is code/sequence allocation and code reuse among multiple BSs/sectors. As shown in Table 1, 12 orthogonal codes have low PAPR for M=12. For 1-bit feedback, a BS may select a pair of orthogonal sequences while other sectors/BS may use other pairs. A total of 6 pairs of orthogonal codes may be available for 12 orthogonal codes and M equal 12. For 2-bit feedback, a set of 4 orthogonal codes are used in one sector/BS and other 3 such orthogonal code sets are available for other sectors/BS.

In an embodiment, for the of 1-bit and 2-bit feedback, transmitter 200 of a network may perform a code/sequence reuse across all the sectors/BSs using a configured/planned deployment. The 1-bit feedback may use a reuse factor 6, and 2-bit feedback may use a reuse factor 3, in an embodiment. Alternatively, a scheduler of the transmitter 200 indicates the code/sequence to be used in a sector/BS.

Figure 4:
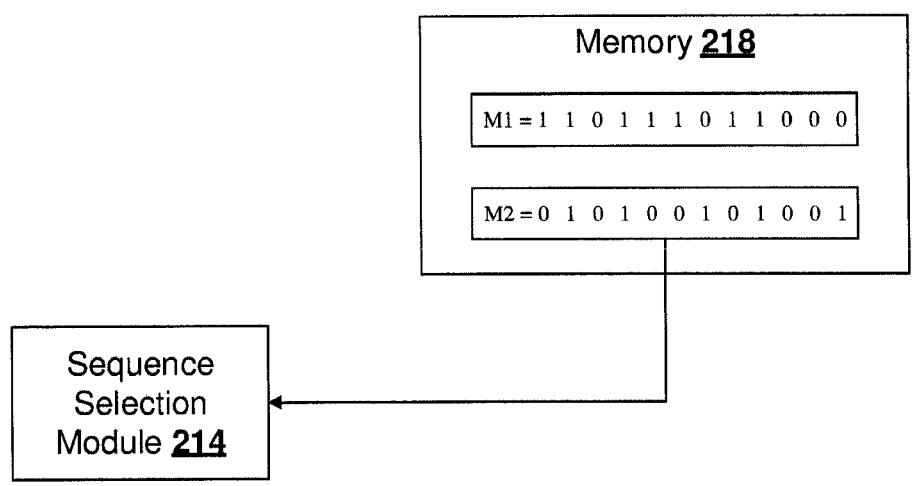
FIG. 4 illustrates selection of sequences corresponding to control bit configured to be transmitted, in accordance with embodiments of the present disclosure.

Referring to FIG. 4, a sequence selection module 214 is shown for selecting one sequence from two sequences generated for 1-bit feedback. Assuming that, sequence M1 is associated with bit "0" and sequence M2 is associated with bit "1". Both the sequences M1 and M2 are stored in the memory 218 of the transmitter 200. FIG. 4 illustrates a scenario where bit "1" should be transmitted. The sequence selection module 214 selects the sequence M2 which corresponds to the bit "1". Further, M2 is rotated, pre-coded and mapped to sub-carriers for generating OFDM waveforms. The OFDM waveforms indicating the bit "1" is transmitted. In another embodiment, the DFT output sequences are stores in memory and sequence selection is done on the DFT output.

As shown in Tables 1-5, orthogonal codes/sequences codes are used for one of 1−D precoding, for M=12. The sequence codes shown in the Tables 1-5, may be used for the of 1-bit and 2-bit physical uplink control channel (PUCCH). For 2-bit PUCCH, every sector/BS may use any one of the four codes, shown in Tables 1 and Tables 2.

As shown in Table 6, 7 semi-orthogonal sequence codes are provided using 1+D and 1−D precoding respectively, where three pairs constructed from the 6 codes may be used in any of the 3 sectors/BSs. The three pairs are preferably orthogonal sequences, in an embodiment. One of the six sequence codes is not orthogonal to that of the remaining five sequence codes, but performance in the presence of inter sector/BS collision is found to be acceptable. Table 4 shows a counterpart of Table 5 with 1−D precoding, in an embodiment of the present disclosure.

In another embodiment, Table 4 provides 6 sequence codes using 1−D precoding where three pairs constructed from the 6 sequence codes may be used in the three sectors/BSs. The three pairs are preferably orthogonal sequences. One sequence code, out of the six sequence codes, is not orthogonal to the remaining five sequence codes, but the correlation is low and performance in the presence of inter sector/BS collision is found to be acceptable.

Table-6 shows 6 semi-orthogonal sequence codes for 1−D precoding and M=12.

In an embodiment, different sectors/BS, may use different set of codes given in the aforementioned Tables 1-4. The codes used in different sectors/BSs may be selected from the Tables 1-4 to provide low mutual correlation. The selection of codes using the Tables 1-5 may be used to conduct a search to obtain codes for other values of M as well as to obtain alternative codes.

In an embodiment, different sectors/BSs, may use different set of sequence codes provided in the Tables 3 and 4. The sequence codes used in different sectors/BSs may be selected to achieve low mutual correlation in the communication network. Also, the as shown in the tables 3 and 4, the sequence codes may be used to conduct a search to obtain the sequence codes for any value of M and obtain alternative sequence codes.

One embodiment of the present disclosure is reducing code collisions through frequency orthogonality. Considering two BSs/sectors are using one of same set of codes, and codes with high correlation, then interference arises between the BSs/sectors. To reduce the interference, an orthogonal frequency resources is allocated in different BSs/sectors. Further, when a short PUCCH uses more than 1 OFDM symbol/waveform, the orthogonal frequency resource allocation may be used in each OFDM symbol, however, different frequency resources may be used in different OFDM symbols. The allocation and use of different frequency resources in each OFDM symbol is referred as frequency hopping (FH). When different BSs/sectors use different FH patterns, interference effects can be reduced.

In an embodiment, the Table-8 below shows 12 orthogonal sequences:

TABLE 8

| PAPR (dB) | BPSK input sequences | DFT output of 1 + D precoder after FFT shift (or frequency domain code word) |
|---|---|---|
| 1.476 | 1 −1 1 1 1 1 1 −1 −1 −1 −1 | 0, 0.2679 + 1.0000i, −6.4641 − 0.2679i, 2.0000 + 2.0000i, −0.4641 − 11.1962i, 3.7321 + 1.0000i, −0.0000 + 4.0000i, 3.7321 − 1.0000i, 6.4641 − 0.8038i, 2.0000 − 2.0000i, 0.4641 − 3.7321i, 0.2679 − 1.0000i |
| 1.86 | −1 −1 −1 1 1 −1 −1 1 1 1 −1 1 −1 1 | 0, 0, 0.7321 − 2.7321i, −2.0000 − 2.0000i, −4.7321 + 1.2679i, 0, −4.0000 + 8.0000i, 7.4641 − 2.0000i, −1.2679 + 4.7321i, −6.0000 + 6.0000i, −2.7321 + 0.7321i, 0.5359 − 2.0000i |
| 0.97 | 1 1 −1 −1 −1 −1 1 1 1 −1 −1 −1 | 0, −1.9282 + 3.1962i, 1.0000 − 1.7321i, −2.0000 − 2.0000i, −3.0000 + 1.7321i, 11.9282 − 7.1962i, 4.0000 + 0.0000i, 1.0000 − 3.7321i, −3.0000 − 1.7321i, 2.0000 − 2.0000i, 1.0000 + 1.7321i, 1.0000 − 0.2679i |

TABLE 8-continued

| PAPR (dB) | BPSK input sequences | DFT output of 1 + D precoder after FFT shift (or frequency domain code word) |
|---|---|---|
| 1.89 | −1 −1 1 −1 −1 1 1 −1 1 1 −1 −1 | 0, −1.0000 − 0.2679i, −1.0000 − 3.7321i, −2.0000 − 2.0000i, −6.4641 − 1.7321i, −1.0000 − 3.7321i, −4.0000 − 8.0000i, 4.4641 + 9.1962i, 0.4641 + 1.7321i, 2.0000 − 2.0000i, −1.0000 − 0.2679i, −2.4641 − 1.1962i |
| 1.86 | 1 1 −1 1 −1 1 −1 −1 −1 1 −1 −1 | 0, 0, 0.7321 + 2.7321i, −2.0000 − 2.0000i, 4.7321 − 1.2679i, 0.0000 + 0.0000i 4.0000 − 8.0000i, 7.4641 − 2.0000i, |
| 1.51 | 1 −1 −1 1 1 −1 1 −1 1 1 1 −1 | 0, 0.4641 − 1.7321i, 1.0000 − 1.7321i, 2.0000 + 2.0000i, −3.0000 + 1.7321i, −6.4641 + 1.7321i, 4.0000 + 0.0000i, 8.4641 − 5.7321i, −3.0000 − 1.7321i, 6.0000 − 6.0000i, 1.0000 + 1.7321i, 1.5359 − 2.2679i |
| 1.82 | −1 1 1 1 −1 −1 1 −1 −1 −1 1 −1 | 0, −1.0000 − 0.2679i, −1.7321 + 3.0000i, −2.0000 − 2.0000i, 5.1962 − 3.0000i, −1.0000 − 3.7321i, −12.0000 + 0.0000i, 1.0000 − 3.7321i, −5.1962 − 3.0000i, 2.0000 − 2.0000i, 1.7321 + 3.0000i, 1.0000 − 0.2679i |
| 1.4761 | 1 −1 1 −1 −1 −1 −1 1 1 1 −1 | 0, −1.0000 − 0.2679i, 3.7321 + 0.4641i, −2.0000 − 2.0000i, 0.8038 + 6.4641i, −1.0000 − 3.7321i, −4.0000 + 0.0000i, 1.0000 − 3.7321i, 11.1962 − 0.4641i, 2.0000 − 2.0000i, 0.2679 − 6.4641i, 1.0000 − 0.2679i |
| 1.47 | 1 1 1 −1 1 −1 1 −1 −1 1 −1 1 | 0, 0.2679 + 1.0000i, 0.4641 + 3.7321i, 2.0000 + 2.0000i, 6.4641 + 0.8038i, 3.7321 + 1.0000i, −0.0000 − 4.0000i, 3.7321 − 1.0000i, −0.4641 + 11.1962i, 2.0000 − 2.0000i, −6.4641 + 0.2679i, 0.2679 − 1.0000i |
| 0.9762 | −1 1 1 1 1 −1 −1 1 1 1 −1 −1 | 0, −3.2679 − 1.8038i, −2.0000 + 0.0000i, 2.0000 + 2.0000i, 0.0000 − 3.4641i, −6.7321 − 12.1962i, 4.0000 + 0.0000i, −2.7321 − 2.73211, 0.0000 + 3.4641i, −2.0000 + 2.0000i, −2.0000 + 0.0000i, 0.7321 + 0.7321i |
| 1.3699 | 1 1 1 1 −1 1 1 1 1 1 1 1 | 0, −0.7321 + 0.7321i, 2.0000 + 0.0000i, 10.0000 + 10.0000i, 0.0000 + 3.4641i, 2.7321 − 2.7321i, −4.0000 + 0.0000i, 2.7321 + 2.7321i, 0.0000 − 3.4641i, −2.0000 + 2.0000i, 2.0000 − 0.0000i, −0.7321 − 0.7321i |
| 1.89 | −1 1 −1 −1 1 1 1 1 1 −1 1 −1 | 0, 1.0000 + 0.2679i, −1.0000 − 3.7321i, 2.0000 + 2.0000i, −6.4641 − 1.7321i, 1.0000 + 3.7321i, −4.0000 − 8.0000i, −4.4641 − 9.1962i, 0.4641 + 1.7321i, −2.0000 + 2.0000i, −1.0000 − 0.2679i, 2.4641 + 1.1962i |

In an embodiment, Table-9 shows sequences generated for 1-bit control data.

TABLE 9

| Bit 0 | Bit 1 |
|---|---|
| −1 −1 −1 −1 −1 −1 −1 −1 −1 −1 1 1 | −1 −1 −1 −1 1 1 −1 1 1 1 1 −1 1 |
| −1 −1 −1 −1 −1 −1 −1 −1 1 1 −1 −1 1 | −1 −1 −1 −1 −1 −1 1 1 1 −1 −1 1 |
| −1 −1 −1 −1 −1 −1 1 1 1 −1 1 −1 | −1 −1 −1 −1 −1 1 1 1 −1 1 −1 1 1 |
| −1 −1 −1 −1 −1 1 −1 1 1 −1 −1 | −1 −1 −1 −1 1 1 −1 1 −1 −1 −1 1 1 |
| −1 −1 −1 −1 −1 1 −1 1 −1 1 1 | −1 −1 −1 −1 −1 1 −1 1 −1 1 −1 1 1 |
| −1 −1 −1 −1 −1 1 −1 1 −1 1 1 −1 −1 | −1 −1 −1 −1 1 1 1 −1 1 1 −1 1 |
| −1 −1 −1 −1 −1 1 1 1 1 1 1 −1 | −1 −1 −1 −1 1 −1 −1 1 1 −1 1 −1 |
| −1 −1 −1 −1 1 1 1 −1 −1 1 −1 −1 −1 | −1 −1 −1 −1 1 −1 −1 1 1 −1 1 1 |
| −1 −1 −1 −1 1 1 1 1 −1 1 1 −1 1 | −1 −1 −1 −1 1 −1 −1 1 −1 1 1 1 |
| −1 −1 −1 1 −1 −1 1 −1 1 −1 1 1 | −1 −1 −1 −1 1 1 1 1 −1 1 1 1 −1 1 |
| −1 −1 −1 1 −1 1 1 −1 −1 1 −1 1 1 | −1 −1 −1 −1 1 1 −1 1 1 −1 1 1 −1 1 |
| −1 −1 −1 1 −1 1 −1 −1 −1 1 1 −1 1 | −1 −1 −1 1 1 1 1 1 −1 1 1 −1 |
| −1 −1 −1 1 −1 1 1 1 1 1 −1 −1 1 | −1 −1 −1 −1 1 −1 −1 1 1 1 −1 1 1 |
| −1 −1 −1 1 1 1 1 1 1 −1 1 −1 1 | −1 −1 −1 1 −1 −1 1 1 1 −1 −1 1 1 |
| −1 −1 1 −1 −1 −1 1 1 1 1 −1 | −1 −1 −1 1 −1 1 1 1 −1 −1 −1 1 1 |

TABLE 9-continued

| Bit 0 | Bit 1 |
|---|---|
| −1 −1 1 −1 −1 1 1 −1 1 1 1 1 | 1 −1 |
| −1 −1 1 1 −1 1 −1 −1 −1 1 1 1 1 1 | −1 1 −1 −1 −1 −1 1 1 −1 1 1 −1 1 |
| −1 −1 1 1 −1 1 −1 −1 −1 −1 1 1 | −1 −1 1 1 1 1 1 1 1 1 1 1 |
| −1 −1 1 1 −1 1 −1 1 1 −1 1 1 1 −1 | −1 −1 1 1 1 1 −1 1 −1 1 1 −1 1 |
| −1 −1 1 1 −1 1 1 1 1 −1 −1 1 1 1 −1 1 | −1 −1 1 1 1 −1 1 −1 1 1 −1 1 1 1 |
| −1 −1 1 1 −1 1 1 1 1 1 1 −1 1 1 | −1 1 −1 1 −1 1 1 1 1 −1 1 1 −1 1 |
| −1 −1 1 1 1 −1 −1 −1 −1 −1 1 1 | −1 1 −1 −1 1 1 1 −1 −1 1 −1 1 |
| −1 −1 1 1 1 1 −1 −1 −1 −1 1 | −1 1 1 −1 1 1 1 1 −1 1 1 1 |
| −1 −1 1 1 1 1 −1 −1 1 1 1 1 | −1 1 1 −1 1 −1 1 1 1 1 −1 1 1 1 |
| −1 1 −1 −1 −1 −1 1 −1 1 −1 1 1 | −1 1 1 −1 1 −1 −1 1 1 −1 1 1 1 1 |
| −1 1 −1 −1 −1 1 1 1 −1 1 −1 1 | −1 1 1 1 1 −1 1 −1 −1 1 1 −1 |
| −1 1 −1 1 1 1 1 1 1 −1 −1 1 1 | −1 1 1 1 −1 −1 1 −1 1 −1 −1 −1 |
| −1 1 −1 −1 1 1 1 1 1 1 −1 1 1 | −1 1 1 1 −1 −1 1 1 −1 −1 1 1 1 |
| −1 1 −1 1 1 1 1 −1 1 1 1 1 | −1 1 1 1 1 −1 1 −1 −1 −1 1 1 |
| 1 1 1 1 1 1 1 −1 1 1 1 1 −1 | 1 1 1 1 1 1 1 −1 1 −1 1 1 1 |

In an embodiment, Table-10 shows sequences generated for 2-bit control data.

TABLE 10

| Bit 00 | Bit 01 |
|---|---|
| -1 -1 -1 -1 -1 -1 1 -1 1 -1 -1 | -1 -1 1 -1 -1 1 1 -1 -1 -1 1 -1 |
| -1 -1 -1 -1 -1 -1 -1 -1 -1 -1 1 1 | -1 -1 1 1 -1 -1 1 -1 1 1 1 -1 1 |
| -1 -1 -1 -1 -1 -1 1 1 -1 -1 1 1 | -1 -1 1 1 -1 -1 1 1 1 -1 1 1 1 -1 1 |
| -1 -1 -1 -1 -1 -1 1 1 1 -1 1 1 | -1 1 -1 1 -1 -1 -1 -1 -1 -1 -1 |
| -1 -1 -1 -1 -1 1 -1 -1 -1 -1 1 | -1 -1 -1 1 1 -1 -1 -1 1 1 1 -1 1 |
| -1 -1 -1 -1 -1 1 -1 1 -1 -1 -1 | -1 -1 -1 -1 1 1 -1 1 1 -1 1 -1 1 |
| -1 -1 -1 -1 -1 1 1 -1 1 -1 1 1 | -1 -1 -1 1 1 -1 -1 -1 -1 -1 1 1 -1 1 |
| -1 -1 -1 -1 1 -1 -1 1 -1 -1 -1 | -1 -1 1 -1 -1 1 1 -1 1 -1 -1 1 1 |
| -1 -1 -1 -1 1 1 -1 -1 -1 -1 -1 | -1 -1 -1 -1 1 -1 -1 1 1 1 -1 -1 |
| -1 -1 -1 1 -1 -1 -1 -1 -1 -1 1 | -1 -1 1 1 1 -1 1 1 1 -1 1 -1 -1 1 |
| -1 -1 -1 -1 1 1 1 -1 1 1 1 -1 1 | -1 -1 1 1 -1 1 1 1 1 -1 1 -1 1 -1 |

| Bit 10 | Bit 11 |
|---|---|
| -1 1 -1 1 -1 1 -1 -1 -1 -1 1 1 | -1 1 1 -1 1 1 -1 1 1 1 1 1 1 -1 |
| -1 1 -1 1 -1 -1 1 1 1 -1 1 -1 1 | -1 1 1 1 1 -1 -1 -1 -1 -1 1 1 -1 -1 1 |
| -1 1 -1 1 -1 -1 -1 -1 1 1 -1 1 | -1 1 1 1 1 -1 -1 1 1 1 1 -1 -1 1 |
| -1 1 -1 1 -1 1 1 1 1 1 1 -1 1 | -1 1 1 1 -1 1 -1 1 -1 -1 -1 -1 1 1 |
| -1 1 -1 1 -1 1 -1 1 1 1 1 -1 1 -1 | -1 1 1 -1 -1 1 1 -1 -1 -1 -1 1 1 1 |
| -1 1 1 1 -1 1 -1 1 -1 -1 -1 1 | -1 1 1 -1 1 -1 1 -1 -1 -1 1 1 -1 |
| -1 1 -1 -1 1 1 -1 1 1 1 -1 1 | -1 1 1 1 -1 1 -1 1 1 -1 -1 1 1 1 |
| -1 1 -1 1 -1 -1 1 -1 1 -1 1 | -1 1 1 1 -1 1 1 1 1 -1 1 -1 -1 -1 1 |
| -1 1 -1 1 -1 -1 -1 1 1 1 -1 1 | -1 1 1 1 -1 -1 1 1 1 -1 1 -1 -1 -1 -1 |
| -1 -1 -1 1 1 -1 1 -1 -1 1 1 1 | -1 1 -1 1 1 -1 1 1 -1 -1 1 1 |
| -1 1 -1 1 1 1 1 -1 1 1 1 -1 -1 | -1 1 1 1 -1 -1 -1 1 1 1 1 1 -1 1 |
| -1 1 1 1 -1 -1 1 1 -1 1 -1 -1 | 1 1 1 1 1 1 1 1 1 1 1 1 |
| 1 1 1 1 1 1 -1 1 1 1 -1 -1 | 1 1 1 1 1 1 1 -1 -1 -1 1 1 |

In an embodiment, for 1-bit case, Table-9 gives 30 base sequences each with a pair of sequences to indicate 1-bit. For 2-bit case, Table-10 gives 11 base sequences each base has 4 sequences to indicate 2 bits.

Figure 5A:
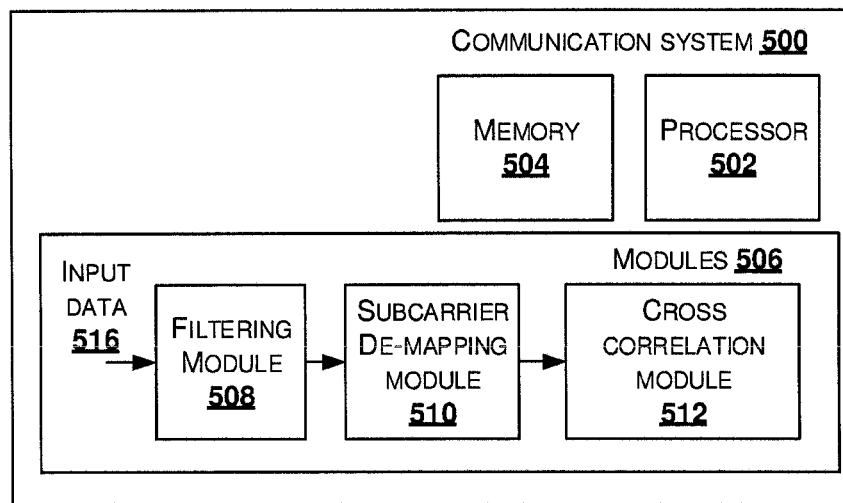
FIG. 5A shows a block diagram illustration of a communication system for receiving frequency domain waveforms in a communication network, in accordance with an embodiment of the present disclosure.
Figure 5B:
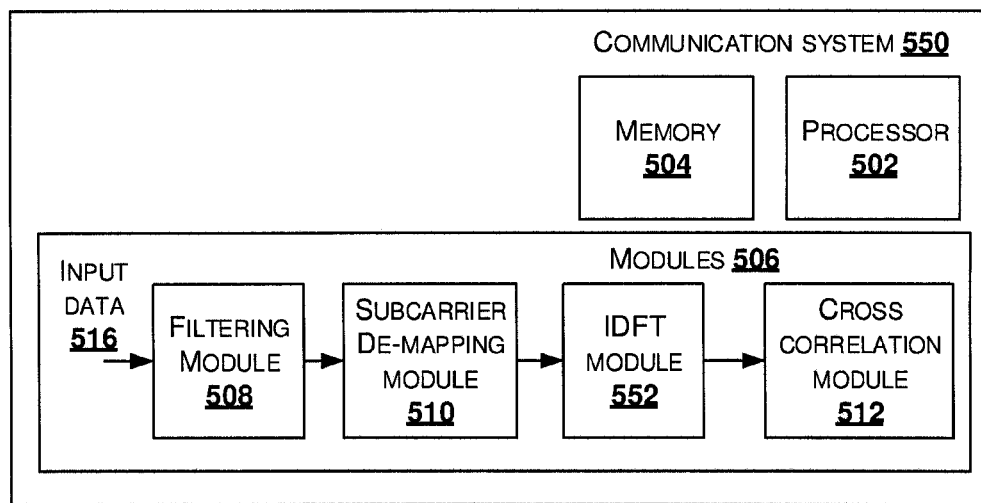
FIG. 5B shows a block diagram illustration of a communication system for receiving time domain waveforms in a communication network, in accordance with an embodiment of the present disclosure.

FIG. 5 shows a block diagram illustration of a receiver 500 for receiving short duration physical uplink control channel (PUCCH) that employs non-coherent detection technique, in accordance with an embodiment of the present disclosure.

As shown in FIG. 5A, the communication system 500 includes a processor 502, and memory 504. The communication system 500 is also referred as receiver 500. The memory 504 may be communicatively coupled to the processor 502. The processor 502 may be configured to perform one or more functions of the receiver 500 for receiving data. In one implementation, the receiver 500 may comprise modules 506 for performing various operations in accordance with the embodiments of the present disclosure.

The modules 506 includes a DFT filtering module 508, a subcarrier de-mapping module 510, and a cross correlation module 512. The filtering module 508 receives an input data 516, generated by a communication system/transmitter 200, and performs DFT filtering of the received input data 516 to generate filtered sequence. The input data 516 may be a 1-2 bit sequence associated with the short duration PUCCH.

The subcarrier de-mapping module 510 performs de-mapping of the filtered sequence to produce de-mapped sequence. The cross-correlation module 512 performs frequency domain cross correlation on the de-mapped sequence to determine the 1-2 bit sequence transmitted by the transmitter 200.

In an embodiment, considering $$z_{p,k} = h_{p,k} R_{m,k} + N_{p,k}, k = 0, 1, 2, \ldots M-1 \ p = 1, 2, \ldots N_r$$

where $z_{p,k}$ denote the received signal at the p th antenna, considering there are $N_r$ antennas for the receiver 500, of kth subcarrier, after subcarrier de-mapping.

$R_{m,k}$ is the m th frequency domain sequence or code word, considering there are Q-such sequences and k is the frequency index that takes values k=0, 1, . . . , M−1; M being total number of allocated subcarriers.

$h_{p,k}$ denotes frequency domain channel response and $N_{p,k}$ includes all background noise and interference signals.

In one embodiment, the receiver 500 is configured with the following metric in frequency domain:

$$c(m) = \sum_{p=1}^{N_r} \left| \sum_{k=0}^{M-1} z_{p,k} R^*_{m,k} \right|^2, m = 1, 2, \ldots Q$$

The receiver 500 is configured such that selecting a value of m that gives maximizes C(m) as the transmitted code word/sequence.

The modules 506 includes a filtering module 508, a subcarrier de-mapping module 510, inverse discrete Fourier transform (IDFT) module 552 and a cross correlation module 512. The filtering module 508 receives an input data 516, generated by a communication system or a transmitter 200, performs DFT filtering the generated filtered sequence. The input data is a 1-2 bit sequence associated with the short duration PUCCH.

The subcarrier de-mapping module 510 performs de-mapping on the filtered sequence to produce de-mapped sequence. The IDFT module 552 performs inverse DFT on the de-mapped sequence to product inverse transformed sequence or time domain sequence. The cross-correlation module 512 performs cross correlation on the time domain sequence to determine the 1-2 bit sequence transmitted by the transmitter 200.

In an embodiment, based on the communication system 200 or transmitter 200 structure, a search is performed by the cross-correlation module 512 to obtain code words/sequences that have zero cross correlation for Q=2, 4 and for 1+D and 1−D precoding. The precoder with 1+D precoding results in a sequence with similar property, as that of 1−D precoding, after swapping the left and right halves of DFT sequence.

An embodiment of the present disclosure may consider two receiver modules. A first receiver module is configured to apply matched filtering (MF) of frequency domain code i.e. one of sequences applied to the user, on each antenna. Also, the first receiver module is configured to performs summation of all outputs of each antenna. The summation is performed over allocated M subcarriers to obtain a decision variable. One of the BPSK and QPSK detection is performed using the decision variable.

Figure 6:
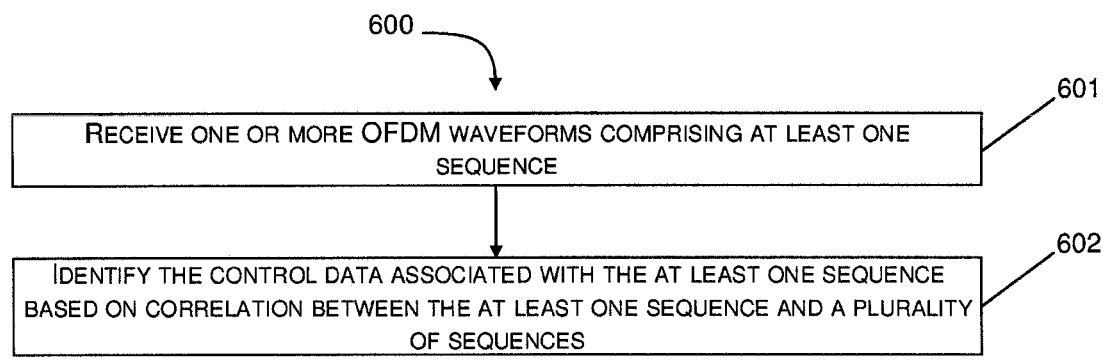
FIG. 6 shows a flow chart illustrating a method of receiving waveforms in a communication network, in accordance with embodiments of the present disclosure.

FIG. 6 illustrates a method for receiving control data on a short PUCCH.

At step 601, filtering module 508 of the receiver 500 receives the one or more OFDM waveforms on the short PUCCH. The filtering module 508 receives an input data 516, generated by a communication system or a transmitter 200, performs filtering such as, but not limited to, noise and interference, i.e. removing the of cyclic prefix (CP), cyclic suffix (CS), windowing, windowing with overlap and adding operation (WOLA) present in the received input data 516 to generate filtered sequence. The input data is a 1-2 bit sequence associated with the short duration PUCCH. The input data 516 comprises the pre-coded waveform/sequence.

At step 602, the cross-correlation module 512 identifies the control data associated with the pre-coded waveform/sequence.

Upon filtering the input data 516, the sub-carrier de-mapping module 510 performs de-mapping of the filtered sequence to produce de-mapped sequence. Further, the cross-correlation module 512 performs frequency domain cross correlation on the de-mapped sequence to determine the 1-2 bit sequence transmitted by the transmitter 200. The correlation is performed between the received sequence and with every sequence stored in the memory 504 of the receiver 500 to determine a coefficient. A coefficient of correlation is determined, and a peak value of coefficient is used to detect the control bits.

In an embodiment, the disclosed methods and system provides reduced PAPR values in the communication system.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of communication, the method comprising:
in a transmitter:
receiving a plurality of sequences representing control data;
selecting a sequence from the plurality of sequences;
obtaining a filtered pi/2 Binary Phase-shift keying (BPSK) Discrete Fourier Transform-Spread Orthogonal Frequency-Division Multiplexing (DFT-S-OFDM) sequence using the selected sequence; and
generating and transmitting a waveform using the filtered pi/2 BPSK DFT-S-OFDM sequence, wherein:
the plurality of sequences comprises $2^N$ sequences,
a plurality of waveforms corresponds to the $2^N$ sequences,
the waveform generated is one of the plurality of waveforms corresponding to the $2^N$ sequences,
the waveform generated is for transmitting control data of length N bits, and
the value of N is 1, 2, . . . , n.

2. The method as claimed in claim 1, wherein:
generating the filtered pi/2 BPSK DFT-S-OFDM sequence comprises generating one of a time-domain filtered DFT-S-OFDM sequence and a frequency-domain filtered DFT-S-OFDM sequence.

3. The method as claimed in claim 2, wherein generation of the time domain filtered DFT-S-OFDM sequence comprises:
rotating the selected sequence to obtain rotated sequence,
precoding the rotated selected sequence to obtain a pre-coded rotated sequence, and
applying DFT on the preceded rotated sequence to obtain a frequency domain sequence.

4. The method as claimed in claim 2, wherein generation of the frequency domain filtered DFT-S-OFDM comprises:
rotating the selected sequence to obtain rotated sequence,
applying DFT on the rotated select sequence to obtain a frequency domain sequence, and
performing a frequency domain filtering on the frequency domain sequence to obtain a filtered frequence domain sequence.

5. The method as claimed in claim 1, wherein generating the waveform comprises:
mapping the frequency domain pre-coded sequence to a predefined number of sub-carriers; and
adding at least one of cyclic prefix (CP), cyclic suffix (CS), windowing, and windowing with overlap and adding operation (WOLA).

6. The method as claimed in claim 1, wherein generating a waveform comprises applying an Inverse Fast Fourier Transform (IFFT).

7. The method as claimed in claim 1, wherein the control data comprises at least one of Acknowledgement (ACK) Negative Acknowledgement (NACK), and 1-bit control information.

8. The method as claimed in claim 1, wherein:
the pre-coding is performed using one of a 1+D pre-coding filter and a 1−D precoding filter, and
D is a delay element.

9. The method as claimed in claim 1, wherein a predefined length of each sequence is 12.

10. The method as claimed in claim 1, wherein four waveforms are allocated to a UE configured for transmitting control data having a length of 2 bits.

11. The method as claimed in claim 1, wherein:
the receiver is operable to apply a correlation to the waveform to detect the control data associated with the selected sequence, and
a peak value of a correlation coefficient is used to identify the control data.

12. A transmitter, comprising:
a memory; and
a processor, communicatively coupled to the memory, configured to:
receive a plurality of sequences representing control data;
select a sequence from the plurality of sequences;
obtain a filtered pi/2 Binary Phase-shift keying (BPSK) Discrete Fourier Transform-Spread Orthogonal Frequency-Division Multiplexing (DFT-S-OFDM) sequence using the selected sequence; and
generate and transmit a waveform using the filtered pi/2 BPSK DFT-S-OFDM sequence, wherein:
the plurality of sequences comprises $2^N$ sequences,
a plurality of waveforms corresponds to the $2^N$ sequences,
the waveform generated is one of the plurality of waveforms corresponding to the $2^N$ sequences,
the waveform generated is for transmitting control data of length N bits, and
the value of N is 1, 2, . . . , n.

13. The transmitter as claimed in claim 12, wherein generation of the filtered pi/2 BPSK DFT-S-OFDM sequence comprises generating one of a time-domain filtered DFT-S-OFDM sequence and a frequency-domain filtered DFT-S-OFDM sequence.

14. The transmitter as claimed in claim 13, wherein generation of the time domain filtered DFT-S-OFDM sequence comprises:
rotating the selected sequence to obtain rotated sequence,
precoding the rotated selected sequence to obtain a pre-coded rotated sequence, and
applying DFT on the preceded rotated sequence to obtain a frequency domain sequence.

15. The transmitter as claimed in claim 13, wherein generation of the frequency domain filtered DFT-S-OFDM comprises:
rotating the selected sequence to obtain rotated sequence,
applying DFT on the rotated select sequence to obtain a frequency domain sequence, and
performing a frequency domain filtering on the frequency domain sequence to obtain a filtered frequence domain sequence.

16. The transmitter as claimed in claim 12, wherein the processor is configured to generate the waveform by:
mapping the frequency domain pre-coded sequence to a predefined number of sub-carriers; and
adding at least one of cyclic prefix (CP), cyclic suffix (CS), windowing, and windowing with overlap and adding operation (WOLA).

17. The transmitter as claimed in claim 12, wherein the processor is configured to generate the waveform by applying an Inverse Fast Fourier Transform (IFFT).

18. The transmitter as claimed in claim 12, wherein the control data comprises at least one of Acknowledgement (ACK) Negative Acknowledgement (NACK), and 1-bit control information.

19. The transmitter as claimed in claim 12, wherein:
the processor is configured to pre-code using one of a 1+D pre-coding filter and a 1−D precoding filter, and
D is a delay element.

20. The transmitter as claimed in claim 12, wherein a predefined length of each sequence is 12.

21. The transmitter as claimed in claim 12, wherein four waveforms are allocated to a UE configured for transmitting control data having a length of 2 bits.

22. A method of communication, the method comprising:
in a transmitter:
receiving a plurality of sequences representing control data;
selecting a sequence from the plurality of sequences;
obtaining a filtered pi/2 Binary Phase-shift keying (BPSK) Discrete Fourier Transform-Spread Orthogonal Frequency-Division Multiplexing (DFT-S-OFDM) sequence using the selected sequence; and
generating and transmitting a waveform using the filtered pi/2 BPSK DFT-S-OFDM sequence, wherein:
the pre-coding is performed using one of a 1+D pre-coding filter and a 1−D precoding filter, and
D is a delay element.

23. The method as claimed in claim 22, wherein:
generating the filtered pi/2 BPSK DFT-S-OFDM sequence comprises generating one of a time-domain filtered DFT-S-OFDM sequence and a frequency-domain filtered DFT-S-OFDM sequence.

24. The method as claimed in claim 23, wherein generation of the time domain filtered DFT-S-OFDM sequence comprises:
rotating the selected sequence to obtain rotated sequence,
precoding the rotated selected sequence to obtain a pre-coded rotated sequence, and
applying DFT on the preceded rotated sequence to obtain a frequency domain sequence.

25. The method as claimed in claim 23, wherein generation of the frequency domain filtered DFT-S-OFDM comprises:
rotating the selected sequence to obtain rotated sequence,
applying DFT on the rotated select sequence to obtain a frequency domain sequence, and performing a frequency domain filtering on the frequency domain sequence to obtain a filtered frequence domain sequence.

26. The method as claimed in claim 22, wherein generating the waveform comprises:
mapping the frequency domain pre-coded sequence to a predefined number of sub-carriers; and
adding at least one of cyclic prefix (CP), cyclic suffix (CS), windowing, and windowing with overlap and adding operation (WOLA).

27. The method as claimed in claim 22, wherein generating a waveform comprises applying an Inverse Fourier Transform (IFFT).

28. The method as claimed in claim 22, wherein the control data comprises at least one of Acknowledgement (ACK) Negative Acknowledgement (NACK), and 1-bit control information.

29. The method as claimed in claim 22, wherein a predefined length of each sequence is 12.

30. The method as claimed in claim 22, wherein four waveforms are allocated to a UE configured for transmitting control data having a length of 2 bits.

31. The method as claimed in claim 22, wherein:
the receiver is operable to apply a correlation to the waveform to detect the control data associated with the selected sequence, and
a peak value of a correlation coefficient is used to identify the control data.

32. A method of communication, the method comprising:
in a transmitter:
receiving a plurality of sequences representing control data;
selecting a sequence from the plurality of sequences;
obtaining a filtered pi/2 Binary Phase-shift keying (BPSK) Discrete Fourier Transform-Spread Orthogonal Frequency-Division Multiplexing (DFT-S-OFDM) sequence using the selected sequence; and
generating and transmitting a waveform using the filtered pi/2 BPSK DFT-S-OFDM sequence, wherein four waveforms are allocated to a UE configured for transmitting control data having a length of 2 bits.

33. The method as claimed in claim 32, wherein:
generating the filtered pi/2 BPSK DFT-S-OFDM sequence comprises generating one of a time-domain filtered DFT-S-OFDM sequence and a frequency-domain filtered DFT-S-OFDM sequence.

34. The method as claimed in claim 33, wherein generation of the time domain filtered DFT-S-OFDM sequence comprises:
rotating the selected sequence to obtain rotated sequence,
precoding the rotated selected sequence to obtain a pre-coded rotated sequence, and
applying DFT on the preceded rotated sequence to obtain a frequency domain sequence.

35. The method as claimed in claim 33, wherein generation of the frequency domain filtered DFT-S-OFDM comprises:
rotating the selected sequence to obtain rotated sequence,
applying DFT on the rotated select sequence to obtain a frequency domain sequence, and
performing a frequency domain filtering on the frequency domain sequence to obtain a filtered frequence domain sequence.

36. The method as claimed in claim 32, wherein generating the waveform comprises:
mapping the frequency domain pre-coded sequence to a predefined number of sub-carriers; and
adding at least one of cyclic prefix (CP), cyclic suffix (CS), windowing, and windowing with overlap and adding operation (WOLA).

37. The method as claimed in claim 32, wherein generating a waveform comprises applying an Inverse Fast Fourier Transform (IFFT).

38. The method as claimed in claim 32, wherein the control data comprises at least one of Acknowledgement (ACK) Negative Acknowledgement (NACK), and 1-bit control information.

39. The method as claimed in claim 32, wherein a predefined length of each sequence is 12.

40. The method as claimed in claim 32, wherein:
the receiver is operable to apply a correlation to the waveform to detect the control data associated with the selected sequence, and
a peak value of a correlation coefficient is used to identify the control data.

41. A transmitter, comprising:
a memory; and
a processor, communicatively coupled to the memory, configured to:
receive a plurality of sequences representing control data;
select a sequence from the plurality of sequences;
obtain a filtered pi/2 Binary Phase-shift keying (BPSK) Discrete Fourier Transform-Spread Orthogonal Frequency-Division Multiplexing (DFT-S-OFDM) sequence using the selected sequence; and
generate and transmit a waveform using the filtered pi/2 BPSK DFT-S-OFDM sequence, wherein:
the processor is configured to pre-code using one of a 1+D pre-coding filter and a 1−D precoding filter, and
D is a delay element.

42. The transmitter as claimed in claim 41, wherein generation of the filtered pi/2 BPSK DFT-S-OFDM sequence comprises generating one of a time-domain filtered DFT-S-OFDM sequence and a frequency-domain filtered DFT-S-OFDM sequence.

43. The transmitter as claimed in claim 42, wherein generation of the time domain filtered DFT-S-OFDM sequence comprises:
rotating the selected sequence to obtain rotated sequence,
precoding the rotated selected sequence to obtain a pre-coded rotated sequence, and
applying DFT on the preceded rotated sequence to obtain a frequency domain sequence.

44. The transmitter as claimed in claim 42, wherein generation of the frequency domain filtered DFT-S-OFDM comprises:
rotating the selected sequence to obtain rotated sequence,
applying DFT on the rotated select sequence to obtain a frequency domain sequence, and
performing a frequency domain filtering on the frequency domain sequence to obtain a filtered frequence domain sequence.

45. The transmitter as claimed in claim 41, wherein the processor is configured to generate the waveform by:
mapping the frequency domain pre-coded sequence to a predefined number of sub-carriers; and
adding at least one of cyclic prefix (CP), cyclic suffix (CS), windowing, and windowing with overlap and adding operation (WOLA).

46. The transmitter as claimed in claim 41, wherein the processor is configured to generate the waveform by applying an Inverse Fast Fourier Transform (IFFT).

47. The transmitter as claimed in claim 41, wherein the control data comprises at least one of Acknowledgement (ACK) Negative Acknowledgement (NACK), and 1-bit control information.

48. The transmitter as claimed in claim 41, wherein a predefined length of each sequence is 12.

49. The transmitter as claimed in claim 41, wherein four waveforms are allocated to a UE configured for transmitting control data having a length of 2 bits.

* * * * *